United States Patent
Koradin et al.

(10) Patent No.: US 12,516,030 B2
(45) Date of Patent: Jan. 6, 2026

(54) PREPARATION OF 2-CHLORO-1-(2-CHLOROTHIAZOL-5-YL)ETHANONE

(71) Applicant: BASF SE, Ludwigshafen (DE)

(72) Inventors: Christopher Koradin, Ludwigshafen (DE); Harish Shinde, Navi Mumbai (IN); Martin John McLaughlin, Liestal (CH); Rahul Kaduskar, Navi Mumbai (IN); Philipp M. Staehle, Ludwigshafen (DE); Roland Goetz, Ludwigshafen (DE); Sunil Khamkar, Navi Mumbai (IN)

(73) Assignee: BASF SE, Ludwigshafen (DE)

( * ) Notice: Subject to any disclaimer, the term of this patent is extended or adjusted under 35 U.S.C. 154(b) by 481 days.

(21) Appl. No.: 18/028,129

(22) PCT Filed: Sep. 28, 2021

(86) PCT No.: PCT/EP2021/076624
§ 371 (c)(1),
(2) Date: Mar. 23, 2023

(87) PCT Pub. No.: WO2022/069462
PCT Pub. Date: Apr. 7, 2022

(65) Prior Publication Data
US 2023/0322693 A1    Oct. 12, 2023

(30) Foreign Application Priority Data
Sep. 29, 2020 (EP) ..................... 20198841

(51) Int. Cl.
*C07D 277/32* (2006.01)
*C07D 277/56* (2006.01)

(52) U.S. Cl.
CPC .................. *C07D 277/56* (2013.01)

(58) Field of Classification Search
CPC .................................... C07D 277/32
See application file for complete search history.

(56) References Cited

FOREIGN PATENT DOCUMENTS

| WO | WO-2014/164084 A2 | 10/2014 |
| WO | WO-2018/197541 A1 | 11/2018 |
| WO | WO-2018/202654 A1 | 11/2018 |
| WO | WO-2020/058010 A1 | 3/2020 |

OTHER PUBLICATIONS

Chalopin, et al., "Second generation of thiazolylmannosides, FimH antagonists for E. coli-induced Crohn's disease", Organic & Biomolecular Chemistry, vol. 14, Issue 16, Mar. 22, 2016, pp. 3913-3925.
European Search Report for EP Patent Application No. 20198841.7, Issued on Feb. 18, 2021, 3 pages.
International Application No. PCT/EP2021/076624, International Search Report and Written Opinion, mailed Dec. 23, 2021.
Rosen et al., One-step synthesis of alpha-chloro acetophenones from acid chlorides and aryl precursors, Org. Lett., 9(4):667-9 (2007).

*Primary Examiner* — Bruck Kifle
(74) *Attorney, Agent, or Firm* — MARSHALL, GERSTEIN & BORUN LLP

(57) ABSTRACT

The present invention relates to a process for the preparation 2-chloro-1-(2-chlorothiazol-5-yl)ethanone.

24 Claims, No Drawings

PREPARATION OF 2-CHLORO-1-(2-CHLOROTHIAZOL-5-YL)ETHANONE

CROSS-REFERENCE TO RELATED APPLICATIONS

This is the U.S. national phase of International Application No. PCT/EP2021/076624, filed Sep. 28, 2021, which claims the benefit of European Patent Application No. 20198841.7, filed on Sep. 29, 2020.

FIELD OF THE INVENTION

The present invention relates to a process for the preparation 2-chloro-1-(2-chlorothiazol-5-yl)ethanone.

BACKGROUND OF THE INVENTION

2-Chloro-1-(2-chlorothiazol-5-yl)ethanone is a valuable intermediate in the synthesis of pyridinium compounds that are inter alia known from WO 2014/164084 A1. These compounds show excellent insecticidal properties.

WO 2018/197541 A1 and WO2018/202654 A1 disclose a synthetic route to these pyridinium compounds which includes the reaction of chloro-(2-chlorthiazol-5-yl)magnesium species and 2-chloro-N-methoxy-N-methyl-acetamide to form 2-chloro-1-(2-chlorothiazol-5-yl)ethanone.

T. Chalopin et al., Second generation of thiazolylmannosides, FimH antagonists for E. coli-induced Crohn's disease, Org. Biomol. Chem., 2016, 14, 3913-3925, describes the synthesis of 1-(2-chlorothiazol-5-yl)ethanone from thiourea.

However, the processes of the prior art suffer from several drawbacks, such as high effluent load and metal salt load, low yields, low selectivity and the use of toxic solvents.

Hence, it is an object of the presently claimed invention to provide a process for the preparation of 2-chloro-1-(2-chlorothiazol-5-yl)ethanone that provides 2-chloro-1-(2-chlorothiazol-5-yl)ethanone in a high overall yield, i.e. ≥80% or ≥75% or ≥70%, with high selectivity.

Efforts have accordingly been invested in finding improved batch reaction procedures as well as alternative methodologies which offer advantages to the classical batch synthetic procedures employed for the synthesis of 2-chloro-1-(2-chlorothiazol-5-yl)ethanone.

SUMMARY OF THE INVENTION

Surprisingly, it has been found that the reaction of 2-chlorothiazole with alkyl magnesium halide followed by reacting the product with chloroacetyl chloride leads to the formation of 2-chloro-1-(2-chlorothiazol-5-yl)ethanone in high yield with high selectivity within a reasonable process time.

A process for the preparation of 2-chloro-1-(2-chlorothiazol-5-yl)ethanone comprising at least the steps of:
a) preparing a compound of formula I

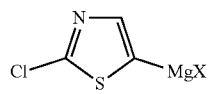

I wherein X is halogen;
by reaction of 2-chlorothiazole with RMgX, wherein R is $C_1$-$C_6$-alkyl;

b1) adding the compound of formula (I) to chloroacetyl chloride in a batch reactor; or
b2) reacting the compound of formula (I) with chloroacetyl chloride in a continuous flow reactor.

DETAILED DESCRIPTION

Before the present compositions, formulations and conditions of the presently claimed invention are described, it is to be understood that this invention is not limited to particular compositions formulations and conditions described, since such compositions formulations and conditions may, of course, vary. It is also to be understood that the terminology used herein is not intended to be limiting, since the scope of the presently claimed invention will be limited only by the appended claims.

A skilled person is familiar with batch synthesis in a batch reactor as well as a continuous flow synthesis in a continuous flow reactor, and these methods or reactors are known in the state of the art.

If hereinafter a group is defined to comprise at least a certain number of embodiments, this is meant to also encompass a group which preferably consists of these embodiments only. Furthermore, the terms 'first', 'second', 'third' or 'a', 'b', 'c', etc. and the like in the description and in the claims, are used for distinguishing between similar elements and not necessarily for describing a sequential or chronological order. It is to be understood that the terms so used are interchangeable under appropriate circumstances and that the embodiments of the presently claimed invention described herein are capable of operation in other sequences than described or illustrated herein.

In case the terms 'first', 'second', 'third' or '(A)', '(B)' and '(C)' or '(a)', '(b)', '(c)', '(d)', 'i', 'ii' etc. relate to steps of a method or use or assay there is no time or time interval coherence between the steps, that is, the steps may be carried out simultaneously or there may be time intervals of seconds, min, hours, days, weeks, months or even years between such steps, unless otherwise indicated in the application as set forth herein above or below.

Furthermore, the ranges defined throughout the specification include the end values as well, i.e. a range of 1 to 10 implies that both 1 and 10 are included in the range. For the avoidance of doubt, applicant shall be entitled to any equivalents according to applicable law.

In the following passages, different aspects of the presently claimed invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to 'one embodiment' or 'an embodiment' means that a particular feature, structure or characteristic described in connection with the embodiment is included in at least one embodiment of the presently claimed invention. Thus, appearances of the phrases 'in one embodiment' or 'in an embodiment' in various places throughout this specification are not necessarily all referring to the same embodiment but may refer to the same embodiment. Further, as used in the following, the terms "preferably", "more preferably", "even more preferably", "most preferably" and "in particular" or similar terms are used in conjunction with optional features, without restricting alternative possibilities. Thus, features introduced by these terms are optional features and are not intended to restrict the scope of the claims in any way.

Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the presently claimed invention, and form different embodiments, as would be understood by those in the art. For example, in the appended claims, any of the claimed embodiments can be used in any combination.

The term "alkyl" as used herein and in the alkyl moieties of alkoxy, alkylthio, and the like refers to saturated straight-chain or branched hydrocarbon radicals having 1 to 2 ("$C_1$-$C_2$-alkyl"), 1 to 3 ("$C_1$-$C_3$-alkyl"), 1 to 4 ("$C_1$-$C_4$-alkyl") or 1 to 6 ("$C_1$-$C_6$-alkyl") carbon atoms. $C_1$-$C_2$-Alkyl is $CH_3$ or $C_2H5$. $C_1$-$C_3$-Alkyl is additionally propyl and isopropyl. $C_1$-$C_4$-Alkyl is additionally butyl, 1-methylpropyl (sec-butyl), 2-methylpropyl (isobutyl) or 1,1-dimethylethyl (tert-butyl). $C_1$-$C_6$-Alkyl is additionally also, for example, pentyl, 1-methylbutyl, 2-methylbutyl, 3-methylbutyl, 2,2-dimethylpropyl, 1-ethylpropyl, 1,1-dimethylpropyl, 1,2-dimethylpropyl, hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, or 1-ethyl-2-methylpropyl.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

The process of the presently claimed invention uses compound of formula I as starting material.

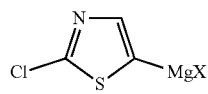

I wherein X is halogen;

Step a):

In an embodiment, the compound of formula I is obtained by reaction of 2-chlorothiazole with RMgX, wherein R is $C_1$-$C_6$-alkyl.

In a preferred embodiment, R is isopropyl;

In a preferred embodiment, X is Cl;

In a preferred embodiment, RMgX is isopropylmagnesium chloride:

In a preferred embodiment, RMgX and 2-chlorothiazole are employed in a molar ratio in the range of ≥0.9:1.00 to ≤1.3:1.00, more preferably in the range of ≥1.00:1.00 to ≤1.1:1.00.

In a preferred embodiment, the reaction is carried out in at least one solvent selected from the group consisting of tetrahydrofuran, dimethoxyethane, and mixture thereof.

In a preferred embodiment, the reaction is carried out by adding tetrahydrofuran solution of Isopropylmagnesium chloride to dimethoxyethane solution of 2-chlorothiazole.

In a preferred embodiment, the initial concentration of 2-chlorothiazole in dimethoxyethane is in the range of ≥119 g/L to ≤790 g/L, more preferably in the range of ≥198 g/L to ≤474 g/L, most preferably is more preferably in the range of ≥198 g/L to ≤474 g/L.

In a preferred embodiment, the isopropylmagnesium chloride is used as solution in tetrahydrofuran, more preferably 20 wt % solution in tetrahydrofuran.

In a preferred embodiment, the reaction is carried out at a temperature in the range of ≥−20° C. to ≤40° C. and more preferably a temperature in the range of ≥0° C. to ≤10° C.

In a preferred embodiment, isopropylmagnesium chloride is added at a rate so that the reaction temperature is maintained in the range of ≥−20° C. to ≤40° C. and more preferably a temperature in the range of ≥0° C. to ≤10° C.

In one embodiment of the invention the step a) is followed by step b1).

Step b1): Reacting the Compound of Formula (I) with a Chloroacetyl Chloride in a Batch Reactor;

In step b1) of the process according to the presently claimed invention, the compound of formula I and chloroacetyl chloride react to form 2-chloro-1-(2-chlorothiazol-5-yl)ethanone.

In a preferred embodiment, step b1) chloroacetyl chloride and the compound of formula (I) are employed in a molar ratio in the range of ≥1.00:1.00 to ≤5.00:1.00, more preferably in the range of ≥2.00:1.00 to ≤3.5:1.00, most preferably the molar ratio of chloroacetyl chloride to compound of formula I is 3.00:1.00.

In a preferred embodiment, step b1) is carried out in at least one solvent selected from the group consisting of toluene, tetrahydrofuran, dimethoxyethane, and mixture thereof.

In a preferred embodiment, the chloroacetyl chloride is used as solution in toluene.

In a preferred embodiment, the initial concentration of chloroacetyl chloride in toluene is in the range of ≥119 g/L to ≤790 g/L, more preferably in the range of ≥198 g/L to ≤474 g/L, most preferably is more preferably in the range of ≥198 g/L to ≤474 g/L.

In a preferred embodiment, chloroacetyl chloride is added to the solution of the compound of formula I of the step a).

In another preferred embodiment, the solution of the compound of formula I of the step a) is added to chloroacetyl chloride.

In one embodiment, step b1) is carried out at temperature in the range ≥−70° C. to ≤−35° C., preferably at temperature in the range ≥−60° C. to ≤−40° C., more preferably at temperature in the range ≥−52° C. to ≤−48° C., most preferably at the temperature −50° C.

In a preferred embodiment, in step b1) the compound of formula I is added to chloroacetyl chloride at a rate so that the reaction temperature is maintained in the range of ≥−70° C. to ≤−35° C., preferably at temperature in the range ≥−60° C. to ≤−40° C., more preferably at temperature in the range ≥−52° C. to ≤−48° C., most preferably at the temperature −50° C.

In another preferred embodiment, chloroacetyl chloride is added to the solution of the compound of formula I of the step a), at a rate so that the reaction temperature is maintained in the range of ≥−70° C. to ≤−35° C., preferably at temperature in the range ≥−60° C. to ≤−40° C., more preferably at temperature in the range ≥−52° C. to ≤−48° C., most preferably at the temperature 50° C.

In another embodiment of the invention the step a) is followed by step b2).

Step b2): Reacting the Compound of Formula (I) with a Chloroacetyl Chloride in a Continuous Flow Reactor.

In step b2) of the process according to the presently claimed invention, the reaction is carried out by continuously feeding compound of formula I and chloroacetyl chloride into a continuous flow reactor;

In an embodiment, the step b2) is carried out at temperature in the range ≥−50° C. to ≤+50° C., preferably at temperature in the range ≥−40° C. to ≤+20° C., more preferably at temperature +0° C.;

In a preferred embodiment, step b2) chloroacetyl chloride and the compound of formula (I) are employed in a molar ratio in the range of ≥1.00:1.00 to ≤5.00:1.00, more preferably in the range of ≥2.00:1.00 to ≤3.5:1.00, most preferably the molar ratio of chloroacetyl chloride to compound of formula I is 1.00:1.00;

In a preferred embodiment, step b2) is carried out in at least one solvent selected from the group consisting of toluene, tetrahydrofuran, dimethoxyethane, and mixture thereof;

In more preferred embodiment, step b2) is carried out in the solvent tetrahydrofuran.

In a preferred embodiment, wherein in the step b2) the continuous flow reactor is selected among a tubular reactor, a ring reactor, and a continuously oscillating reactor which is capable to achieve high heat transfer rates;

The mixing of compound of formula I and chloroacetyl chloride might be done with any passive or active mixer. Due to the mixing in step b2), a homogenous reaction media might be achieved before the reaction starts. Hence, concentration gradients might be smaller leading to a better selectivity. Due to the heat transfer, the heat of the exothermic reaction can be removed quickly. Hence, hot spots leading to side components might be minimized.

In a preferred embodiment, wherein in the step b2) the surface of the inner wall of the continuous flow reactor is made of stainless steel or Hastelloy.

Advantages

The presently claimed invention is associated with at least one of the following advantages:
(i) The step a) followed by step b1) can be carried out in one pot.
(ii) The step b2) can be carried out in a continuous flow reactor, wherein the reaction is carried out within short period of time consequently forming less byproducts.
(iii) 2-chloro-1-(2-chlorothiazol-5-yl)ethanone is provided in a high overall yield and with a high purity from 2-chlorothiazole.
(iv) 2-chloro-1-(2-chlorothiazol-5-yl)ethanone is provided in a high overall yield with high selectivity from 2-chlorothiazole.
(v) The process of the presently claimed invention can use process benign solvents.
(vi) The process of the presently claimed invention can involve a low effluent load.
(vii) The process of the presently claimed invention is safe and can be easily controlled.
(viii) The process of the presently claimed invention is economical, because the compound of formula I is added within a reasonable process time.

In the following, there is provided a list of embodiments to further illustrate the present disclosure without intending to limit the disclosure to the specific embodiments listed below.

EMBODIMENTS

1. A process for the preparation of 2-chloro-1-(2-chlorothiazol-5-yl)ethanone comprising at least the steps of:
a) preparing a compound of formula I

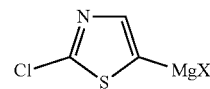

wherein X is halogen;
by reaction of 2-chlorothiazole with RMgX, wherein R is $C_1$-$C_6$-alkyl;
b1) reacting the compound of formula (I) with a chloroacetyl chloride in a batch reactor; or
b2) reacting the compound of formula (I) with a chloroacetyl chloride in a continuous flow reactor.
2. The process according to embodiment 1, wherein in step a) R is isopropyl.
3. The process according to embodiment 1 or 2, wherein in step a) X is Cl.
4. The process according to any of the embodiment 1, wherein in step a) RMgX is isopropylmagnesium chloride.
5. The process according to any of the embodiment 1 to 4, wherein in step a) RMgX and 2-chlorothiazole are employed in a molar ratio in the range of ≥0.9:1.00 to ≤1.3:1.00.
6. The process according to any of the embodiment 1 to 5, wherein in step a) isopropylmagnesium chloride and 2-chlorothiazole are employed in a molar ratio in the range ≥1.00:1.00 to ≤1.1:1.00.
7. The process according to any of the embodiment 1 to 6, wherein the wherein in step a) the reaction is carried out in at least one solvent selected from the group consisting of tetrahydrofuran, dimethoxyethane, and mixture thereof.
8. The process according to any of the embodiment 1 to 6, wherein in step a) 2-chlorothiazole is used as dimethoxyethane solution.
9. The process according to any of embodiments 8, wherein in step a) the concentration of 2-chlorothiazole in dimethoxyethane is in the range of ≥119 g/L to ≤790 g/L.
10. The process according to any of embodiments 8 or 9, wherein step a) the concentration of 2-chlorothiazole in dimethoxyethane is in the range of ≥198 g/L to ≤474 g/L.
11. The process according to embodiment 7, wherein in step a) the concentration of 2-chlorothiazole in the at least one solvent is in the range of ≥100 g/L to ≤800 g/L.
12. The process according to any of embodiments 8 to 11, wherein in step a) the concentration of 2-chlorothiazole in dimethoxyethane is 395 g/L.
13. The process according to any of embodiments 1 to 12, wherein in step a) the reaction is carried out at temperature in the range of ≥−20° C. to ≤40° C.
14. The process according to any of embodiments 1 to 13, wherein step a) the reaction is carried out at temperature in the range of ≥0° C. to ≤10° C.

15. The process according to embodiment 1, wherein step a) is followed by step b1).
16. The process according to embodiments 1 or 15, wherein in step b1) the molar ratio of chloroacetyl chloride to compound of formula I is in the range of ≥1.00:1.00 to ≤5.00:1.00.
17. The process according to any of embodiments 1, 15, or 16, wherein in step b1) the molar ratio of chloroacetyl chloride to compound of formula I is in the range of ≥2.00:1.00 to ≤3.5:1.00.
18. The process according to any of embodiments 1 and 15 to 17, wherein in step b1) is carried out in at least one solvent selected from the group consisting of toluene, tetrahydrofuran, dimethoxyethane, and mixture thereof.
19. The process according to embodiment 1 and 15 to 18, wherein in step b1) the chloroacetyl chloride is used as solution in toluene.
20. The process according to embodiment 1 and 15 to 19, wherein in step b1) the concentration of chloroacetyl chloride in toluene is in the range of ≥119 g/L to ≤790 g/L.
21. The process according to embodiment 1 and 15 to 20, wherein in step b1) the concentration of chloroacetyl chloride in toluene is in the range of ≥198 g/L to ≤474 g/L.
22. The process according to any of embodiments 1 and 15 to 21, wherein in step b1) the concentration of chloroacetyl chloride in toluene is 395 g/L.
23. The process according to any of embodiments 1 and 15 to 22, wherein step b1) is carried out in at at temperature in the range ≥−70° C. to ≤−35° C.
24. The process according to any of embodiments 1 and 15 to 23, wherein step b1) is carried out at temperature in the range ≥−60° C. to ≤−40° C.
25. The process according to any of embodiments 1 and 15 to 24, wherein step b1) is carried out at temperature in the range ≥−55° C. to ≤−45° C.
26. The process according to any of embodiments 1 and 15 to 25, wherein step b1) is carried out at the temperature −50° C.
27. The process according to any of embodiments 1 to 22, wherein the wherein step a), followed by step b1) are carried out in a one-pot.
28. The process according to embodiment 1, wherein step a) is followed by step b2).
29. The process according to the embodiment 1 or 28, in step b2) the reaction is carried out by continuously feeding compound of formula I and chloroacetyl chloride into a continuous flow reactor;
30. The process according to embodiment 1 and 28 to 29, wherein the step b2) is carried out at temperature in the range ≥−50° C. to ≤50° C.;
31. The process according to any of embodiment 1 and 28 to 30, wherein the step b2) is carried out at temperature in the range ≥−40° C. to ≤20° C.
32. The process according to any of embodiments 1 and 28 to 31, wherein the step b2) is carried out at temperature 0° C.
33. The process according to any of embodiments 1 and 28 to 32, wherein step b2) the molar ratio of chloroacetyl chloride to compound of formula I is in the range of ≥1.00:1.00 to ≤5.00:1.00.
34. The process according to any of embodiments 1 and 28 to 33, wherein step b2) the molar ratio of chloroacetyl chloride to compound of formula I is in the range of ≥2.00:1.00 to ≤3.5:1.00.
35. The process according to any of embodiments 1 and 28 to 34, wherein step b2) the molar ratio of chloroacetyl chloride to compound of formula I is 3.00:1.00.
36. The process according to any of embodiments 1 and 28 to 37, step b2) is carried out in at least one solvent selected from the group consisting of tetrahydrofuran, dimethoxyethane, toluene, and mixture thereof, preferably in mixture of tetrahydrofuran, dimethoxyethane, toluene.
37. The process according to any of embodiments 1 and 28 to 38, step b2) is carried out in the solvent tetrahydrofuran.
38. The process according to any of embodiments 1 and 28 to 39, wherein in the step b2) the surface of the inner wall of the continuous flow reactor is made of stainless steel or Hastelloy.

EXAMPLES

The presently claimed invention is illustrated in detail by non-restrictive working examples which follow.

Methods

The characterization was by coupled High Performance Liquid Chromatography/mass spectrometry (HPLC/MS), Gas chromatography (GC), by NMR or by melting points.

HPLC method: Agilent Eclipse XDB-C18, 150 mm×4.6 mm ID×5 um

Gradient A=0.5% H2SO4 in water, B=acetonitrile.

Flow=1.1 mL/min, column oven temperature=30 C

Gradient program=20% B—100% B—15 min

Run Time=15 min

LCMS method 1: C18 Column (50 mm×2.1 mm×1.7μ)

Gradient A=0.1% TFA in water, B=acetonitrile

Flow=0.8 mL/min to 1.0 mL/min in 1.5 min, column oven temperature=60° C.

Gradient program=10% B to 100% B in 15 min, hold for 1 min 100% B, 1 min—10% B

Run time: 1.75 min $^1$H-NMR: The signals are characterized by chemical shift (ppm) vs. tetramethylsilane, by their multiplicity and by their integral (relative number of hydrogen atoms given). The following abbreviations are used to characterize the multiplicity of the signals: m=mutiplet, q=quartet, t=triplet, d=doublet and s=singlet.

Abbreviations used are: h for hour(s), min for minute(s), rt for retention time and ambient temperature for 20-25° C.

Example 1: Preparation of 2-chloro-1-(2-chlorothiazol-5-yl)ethanone

Step a) Preparation of the Compound of Formula I:

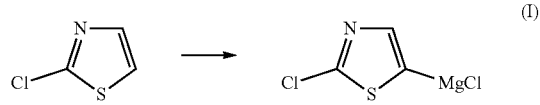

50 g (98%, 1.0 eq) 2-chlorothiazol was dissolved in 110 g dimethoxyethane (3.0 eq) and cooled to 0° C. 234 g Isopropylmagnesium chloride-solution (ca. 20% in THF, 1.10 eq) was dosed over 2 h under the formation of propane. The reaction mixture was warmed up to room temperature and stirred overnight. The formation of I was detected by quenching an aliquot with iodine. The formed 2-chloro-5- iodo-thiazole was analyzed by HPLC (RT 9.7 min) and LC/MS (RT 1.05 min, [M+H]$^+$ 246.

Step b1): Reacting the Compound of Formula (I) with a Chloroacetyl Chloride in a Batch Reactor:

The reaction mixture of step a) was dosed into a solution of 138 g chloroacetyl chloride (3 eq) in 94 g toluene at −50° C. After 30 min, the mixture was warmed to −20° C. and quenched with 149 g aq. HCl (5%, 0.5 eq) in 30 min. The biphasic mixture was warmed to room temperature and the layers were separated. The aq. phase was re-extracted with toluene, the organic phases were combined and washed with 10% aq. sodium carbonate solution and water. The solution was concentrated under vacuum (291 g, ~21 wt %, 76% yield). δ (ppm)=4.5, s, 2H; 8.25, s. 1H.

The following table 1 gives an overview of different addition rates. All examples were carried out in identical manner with example 1. However, in each case, the addition rate of chloroacetyl chloride and reaction temperature were modified. Unknown impurities were detected.

TABLE 1

| Example | equivalent of chloroacetyl chloride | Temperature [° C.] | addition time in Hrs | Yield [%] |
|---|---|---|---|---|
| 2 | 2 | −70 | 2 | 66 |
| 3 | 2 | −40 | 2 | 73 |
| 4 | 1.5 | −50 | 2 | 70 |
| 5 | 3 | −50 | 2 | 76 |
| 6 | 3 | 0 | 2 | 66 |
| 7 | 3 | −20 | 2 | 69 |
| 8 | 3 | −50 | 6 | 73 |
| 9 | 3 | −50 | 8 | 73 |
| 10 | 3 | −50 | 0.5 | 78 |

Example 2: Preparation of 2-chloro-1-(2-chlorothiazol-5-yl)ethenone

Step a) Preparation of the Compound of Formula I:

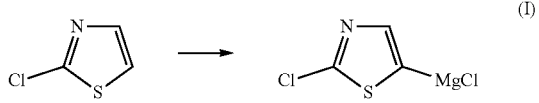
(I)

50 g (98%, 1.0 eq) 2-chlorothiazol was dissolved in 110 g dimethoxyethane (3.0 eq) and cooled to 0° C. 234 Iso-propylmagnesiumchloride-solution (20% in THF, 1.10 eq) was dosed over 2 h under the formation of propane. The reaction mixture was warmed up to room temperature and stirred overnight. The formation of I was detected by quenching an aliquot with iodine. The formed 2-chloro-5-iodo-thiazole was analyzed by HPLC (RT 9.7 min) and LC/MS (RT 1.05 min, [M+H]$^+$ 246.

Step b2): Reacting the Compound of Formula (I) with a Chloroacetyl Chloride in a Continuous Flow Reactor:

Setup:
HPLC pumps controlled by mass flow controllers
Pressure dampeners
Stainless steel tubings
Passive mixer
Cryostat for temperature control
Reactor tube and mixer submerged in tempering bath of the cryostat Starting Materials:
Formula I (Component A):

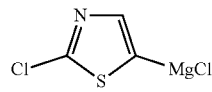

in dimethoxyethane and tetrahydrofuran;
Component B:

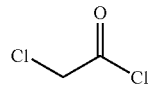

Chloracetyl chloride in Toluene.
Component C: tetrahydrofuran.
Results:
Variation of Synthesis Temperature:

| equivalent of chloroacetyl chloride mol/mol | Comp A ml/min | Comp B ml/min | T synthesis ° C. | Main product ar % HPLC |
|---|---|---|---|---|
| 3.9 | 7.3 | 9.6 | −40 | 92 |
| 2.6 | 7.3 | 6.3 | −40 | 89 |
| 3.9 | 7.3 | 9.6 | −20 | 92 |
| 2.6 | 7.3 | 6.3 | −20 | 92 |
| 3.9 | 14.6 | 19.2 | −20 | 93 |
| 3.9 | 7.3 | 9.6 | 0 | 92 |
| 2.6 | 7.3 | 6.3 | 0 | 92 |
| 3.9 | 7.3 | 9.6 | 20 | 92 |
| 2.6 | 7.3 | 6.3 | 20 | 90 |
| 3.9 | 7.3 | 9.6 | 20 | 93 |
| 3.9 | 3.7 | 4.8 | 20 | 92 |
| 3.9 | 11.0 | 14.4 | 20 | 93 |

Variation of Molar Ratio at a Constant Synthesis Temperature of 0° C.:

| equivalent of chloroacetyl chloride mol/mol | Comp A g/min | Comp B g/min | Yield % |
|---|---|---|---|
| 3 | 10 | 6.5 | 76 |
| 4 | 10 | 8.7 | 77 |
| 5 | 10 | 10.9 | 76 |
| 3 | 20 | 10.9 | 76 |
| 3 | 20 | 13.0 | 77 |
| 3 | 10 | 6.5 | 74 |
| 4 | 20 | 17.4 | 81 |

The invention claimed is:
1. A process for preparing 2-chloro-1-(2-chlorothiazol-5-yl) ethanone comprising at least:
    a) preparing a compound of formula I

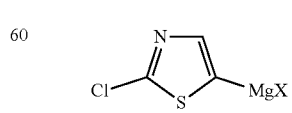
I wherein X is halogen;
by reacting 2-chlorothiazole with RMgX, wherein R is $C_1$-$C_6$-alkyl;

b1) reacting the compound of formula (I) with a chloroacetyl chloride in a batch reactor;
or
b2) reacting the compound of formula (I) with a chloroacetyl chloride in a continuous flow reactor.

2. The process according to claim 1, wherein in step a) R is isopropyl.

3. The process according to claim 1, wherein in step a) X is Cl.

4. The process according to claim 1, wherein in step a) RMgX is isopropylmagnesium chloride.

5. The process according to claim 1, wherein in step a) RMgX and 2-chlorothiazole are employed in a molar ratio in the range of $\geq 0.9:1.00$ to $\leq 1.3:1.00$.

6. The process according to claim 1, wherein in step a) the reaction is carried out in at least one solvent selected from the group consisting of tetrahydrofuran, dimethoxyethane, and a mixture thereof.

7. The process according to claim 1, wherein in step a) the reaction is carried out in a mixture of tetrahydrofuran and dimethoxyethane.

8. The process according to claim 1, wherein in step a) isopropylmagnesium chloride is added as tetrahydrofuran solution to 2-chlorothiazole.

9. The process according to claim 7, wherein in step a) the initial concentration of 2-chlorothiazole in dimethoxyethane is in a range of $\geq 119$ g/L to $\leq 790$ g/L.

10. The process according to claim 1, wherein in step a) the reaction is carried out at temperature in the range of $\geq -20°$ C. to $\leq 40°$ C.

11. The process according to claim 1, wherein step a) is followed by step b1).

12. The process according to claim 1, wherein in step b1) chloroacetyl chloride and the compound of formula (I) are employed in a molar ratio in a range of $\geq 1.00:1.00$ to $\leq 5.00:1.00$.

13. The process according to claim 1, wherein step b1) is carried out in at least one solvent selected from the group consisting of toluene, tetrahydrofuran, dimethoxyethane, xylenes, ethylbenzene, chlorobenzene, methyl tert-butyl ether, and a mixture of two or more thereof.

14. The process according to claim 1, wherein in step b1) is carried out in at least one solvent selected from the group consisting of toluene, tetrahydrofuran, dimethoxyethane, and a mixture of two or more thereof.

15. The process according to claim 1, wherein step b1) is carried out at temperature in the range $\geq -70°$ C. to $\leq -35°$ C.

16. The process according to claim 11, wherein step b1) is carried out at temperature in the range $\geq -60°$ C. to $\leq -40°$ C.

17. The process according to claim 11, wherein step b1) is carried out at temperature in the range $\geq -52°$ C. to $\leq -48°$ C.

18. The process according to claim 1, wherein the wherein step a), and b1) are carried out in a one-pot reaction.

19. The process according to claim 1, wherein step a) is followed by step b2).

20. The process according to claim 1, wherein the step b2) is carried out by continuously feeding the compound of formula (I) and chloroacetyl chloride into a continuous flow reactor.

21. The process according to claim 1, wherein the step b2) is carried out at temperature in a range $\geq -50°$ C. to $\leq 50°$ C.

22. The process according to claim 1, wherein the step b2) chloroacetyl chloride and the compound of formula (I) are employed in a molar ratio in the range of $\geq 1.00:1.00$ to $\leq 5.00:1.00$.

23. The process according to claim 1, wherein step b2) is carried out in at least one solvent selected from the group consisting of tetrahydrofuran, dimethoxyethane, and a mixture thereof.

24. The process according to claim 1, wherein in step b2) a surface of the inner wall of the continuous flow reactor is made of stainless steel or Hastelloy.

\* \* \* \* \*